United States Patent
Sharman et al.

(10) Patent No.: US 9,725,108 B2
(45) Date of Patent: Aug. 8, 2017

(54) STEERING ASSEMBLIES

(71) Applicant: TRW Limited, Solihull West Midlands (GB)

(72) Inventors: David Michael Sharman, Leicestershire (GB); Stephen George Moulson, Carmarthenshire (GB); Jason Hales, Nottingham (GB)

(73) Assignee: TRW Limited, Solihull, West Midlands (GB)

( * ) Notice: Subject to any disclaimer, the term of this patent is extended or adjusted under 35 U.S.C. 154(b) by 134 days.

(21) Appl. No.: 14/391,806

(22) PCT Filed: Apr. 9, 2013

(86) PCT No.: PCT/GB2013/050912
§ 371 (c)(1),
(2) Date: Oct. 10, 2014

(87) PCT Pub. No.: WO2013/153374
PCT Pub. Date: Oct. 17, 2013

(65) Prior Publication Data
US 2015/0069747 A1  Mar. 12, 2015

(30) Foreign Application Priority Data
Apr. 10, 2012  (GB) .................. 1206307.9

(51) Int. Cl.
*B62D 1/19* (2006.01)
*F16F 7/12* (2006.01)

(52) U.S. Cl.
CPC ............. *B62D 1/192* (2013.01); *B62D 1/195* (2013.01); *F16F 7/127* (2013.01)

(58) Field of Classification Search
CPC .......... B62D 1/192; B62D 1/195; F16F 7/127
See application file for complete search history.

(56) References Cited

U.S. PATENT DOCUMENTS

| 3,893,726 A | 7/1975 | Strohschein |
| 5,503,431 A * | 4/1996 | Yamamoto ............. B62D 1/184 188/376 |

(Continued)

FOREIGN PATENT DOCUMENTS

| EP | 1015291 B1 | 7/1999 |
| EP | 1094240 A2 | 4/2001 |

(Continued)

*Primary Examiner* — Paul N Dickson
*Assistant Examiner* — Joselynn Y Sliteris
(74) *Attorney, Agent, or Firm* — MacMillan, Sobanski & Todd, LLC

(57) ABSTRACT

A collapsible steering column assembly includes a shroud comprising an outer tube that supports a steering wheel through a bearing and an inner tube that is fixed to a part of the vehicle, the column assembly being able to collapse telescopically by the outer tube moving over the inner tube, the assembly further including an energy absorbing strap that is fixed to the inner tube and a plough which is fixed to the outer tube, whereby in use the assembly is so arranged that upon a telescopic collapse the relative movement between the inner tube and the outer tube forces a part of the plough through the strap to progressively peel away a part of the strap from the remainder of the strap.

12 Claims, 4 Drawing Sheets

(56) References Cited

U.S. PATENT DOCUMENTS

| | | | | |
|---|---|---|---|---|
| 5,669,633 | A * | 9/1997 | Naff | B62D 1/192 188/376 |
| 5,738,377 | A * | 4/1998 | Sugiki | B62D 1/195 188/376 |
| 5,829,310 | A | 11/1998 | DePaolis | |
| 6,039,502 | A * | 3/2000 | Naff | B62D 1/16 280/777 |
| 6,394,241 | B1 * | 5/2002 | Desjardins | B60G 21/0553 188/293 |
| 6,575,497 | B1 * | 6/2003 | McCarthy | F16F 7/128 280/777 |
| 7,422,240 | B2 * | 9/2008 | Grams | B62D 1/192 280/777 |
| 7,497,470 | B2 * | 3/2009 | Streng | B62D 1/192 188/371 |
| 7,648,168 | B2 * | 1/2010 | Oh | B62D 1/195 280/777 |
| 7,669,500 | B2 * | 3/2010 | Matsui | F16F 7/123 280/775 |
| 8,590,933 | B2 * | 11/2013 | Narita | B62D 1/184 280/777 |
| 8,632,098 | B2 * | 1/2014 | Davies | B62D 1/195 280/777 |
| 2006/0290129 | A1 | 12/2006 | Inayoshi et al. | |
| 2007/0113701 | A1 | 5/2007 | Streng et al. | |
| 2007/0228717 | A1 * | 10/2007 | Tanai | B62D 1/195 280/777 |

FOREIGN PATENT DOCUMENTS

| | | |
|---|---|---|
| GB | 1296527 A | 11/1972 |
| GB | 2247652 A | 3/1992 |
| GB | 2454345 A | 5/2009 |

* cited by examiner

STEERING ASSEMBLIES

CROSS-REFERENCE TO RELATED APPLICATIONS

This application is a national stage of International Application No. PCT/GB2013/050912 filed Apr. 9, 2013, the disclosures of which are incorporated herein by reference in entirety, and which claimed priority to Great Britain Patent Application No. 1206307.9 filed Apr. 10, 2012, the disclosures of which are incorporated herein by reference in entirety.

BACKGROUND OF THE INVENTION

The invention relates to collapsible steering column assemblies of the kind which include a steering shaft that passes through and is supported by a shroud that comprises an outer tube and an inner tube, at least one of which is securely fixed to a part of the vehicle body, the two tubes being free to telescopically collapse relative to each other when a crash force is applied to the steering wheel.

Collapsible Steering column assemblies are known which include a clamp mechanism that when locked prevents unwanted relative movement of the inner and outer tubes of the shroud of the steering column assembly. The clamp mechanism can be unlocked by movement of a locking lever or, sometimes, electrically using a motor or perhaps hydraulically or pneumatically.

By releasing the clamp mechanism and telescopically sliding the outer tube of the shroud over the inner tube the length of the shroud can be altered, altering the reach position of an associated steering wheel. By moving both tubes together up and down relative to the clamp mechanism the rake can be adjusted. In some assemblies only one of reach and rake may be adjusted.

The clamp mechanism may be attached to a bracket (known as a Rake Bracket) which is connected to the vehicle through one or more frangible fasteners. In the event of a crash causing a high load to be applied to the wheel the fasteners can sever allowing the bracket and the clamp mechanism to move relative to the vehicle, in turn allowing whichever part of the shroud it is secured to also to move so the wheel can collapse away from the driver.

To control the rate of collapse it is known to provide an energy absorbing device such as one or more straps which engages the vehicle body at one end and the clamp mechanism at the other. As the bracket moves relative to the vehicle it causes the strap to deform beyond its elastic limit and this deformation absorbs some of the energy, controlling the rate of collapse.

In many collapsible columns, a pair of Energy Absorption Straps (EAS's) is anchored to the fixings blocks (the so-called fusible "Capsules") via which the steering column's bracket is mounted to a part of the vehicle structure (usually the so-called "cross-car beam") at its two upper mountings. Each strap passes over (or through) a labyrinthine "anvil" which is fixed to a rake bracket secured to the vehicle body. The EAS, which is generally straight, is deformed locally, in order to navigate the anvil.

Typically, each capsule has a vertical hole at its centre through which passes a downward extending mounting stud which is integral with the vehicle's structure. The capsule is secured to the rake bracket by small in-situ moulded plastic pins which break if there is a severe impact by the driver's torso on the steering wheel. In a crash, the anchored end of each strap remains stationary relative to the vehicle structure while the rake bracket, which incorporates the anvils, moves forwards. This causes the anvil to be dragged along the EAS, progressively deforming and then straightening each element of it. The effect is to absorb the kinetic energy of the driver's upper torso in a progressive manner and to thereby avoid excessive peak forces.

BRIEF SUMMARY OF THE INVENTION

The present invention provides a collapsible steering column assembly which includes a shroud comprising an outer tube that supports a steering wheel through a bearing and an inner tube that is fixed to a part of the vehicle, the column assembly being able to collapse telescopically by the outer tube moving over the inner tube, the assembly further including an energy absorbing strap that is fixed to the inner tube and a plough which is fixed to the outer tube, whereby in use the assembly is so arranged that upon a telescopic collapse the relative movement between the inner tube and the outer tube forces a part of the plough through the strap to progressively peel away a part of the strap from the remainder of the strap.

The provision of a plough which is pushed or dragged along the strap so that a part of the plough ploughs into the strap to physically peel part of it away from the rest of the strap helps absorb energy, controlling the collapse of the column. The term plough is used to describe this part because of the cutting/tearing/ripping action or "ploughing" motion that arises as it is pushed or dragged along the strip and tears the part of the strap up away.

The plough may comprise a wedge member that has an inclined front face terminating in a leading edge that is located below a part of the strap which projects out away from the inner tube and during collapse this inclined front face is driven along the strap to progressively tear that part away from the inner tube. The leading edge can be but does not need not be especially sharp, because it does not need to cut the part of the strip away from the inner tube, brute force of the plough moving along and through the strap tearing a strip away from the rest of the strap along its length.

The plough preferably also includes a pressing part which is located above a portion of the strap adjacent the part that is torn away by the inclined front face, the pressing part optionally pressing down on a portion of the strap when in use to hold that part of the strap down towards the inner tube whilst the inclined front face of the wedge progressively peels away the associated part of the strap. The plough therefore may have a part that passes below the strap and a part that simultaneously passes above the strap, the strap tearing at the join between the "above and below" parts of the plough.

In a most preferred arrangement the plough comprises two spaced apart inclined front faces, each having a first leading edge that is located below a respective part of the strap that extends away from the inner tube on either side of the pressing part, the two wedges of the plough peeling away two parallel strips of the strap leaving a central strip in place.

Alternatively, a single wedge may be provided which is flanked on each side by a pressing part above the strap. This will cause a single strip to be peeled away from the middle of the strap, leaving two outer strips attached to the inner tube.

To help the progressive peeling, the strap may be provided with one or more tear lines along which it will preferentially tear due to the action of the plough, the tear line or lines preferably being aligned with an end of a leading edge of the plough. Most preferably the strap may include two tear lines, such as grooves, along its length to define a central portion and two outer portions, the outer portions being located above the first leading edges and the inner portions below the pressing part. Each groove may be coincident with a corresponding groove on an opposing side of the strap, e.g. one groove on the top and one below, to leave a thin line of strap along which the tearing occurs during a crash. The grooves may be continuous, and preferably are parallel to each other and to the long axis of the strap.

The inclined front face of the wedge of the plough may be concave, increasing in gradient the further from the leading edge. This shape has been found to be beneficial as it encourages the part of the strap that is peeled away to form a curl during a collapse, curling up on itself. The curl ensures that the peeled strap does not foul any part of the steering system as it might otherwise flail around and interfere with a part of the steering mechanism. The more concave the inclined face of the wedge the more tight the curl will be that is formed.

The assembly may comprise a single or double adjust steering column assembly and may include a clamp mechanism that includes a part that is fixed relative to the outer tube, the two tubes being releasably engaged by the clamp mechanism to selectively permit an amount of relative movement between the tubes that is required during adjustment of the steering column assembly, The part of the clamp assembly that is fixed to the outer tube may be fixed to the plough so that the plough is fixed relative to the outer tube portion when the clamp assembly is both the clamped and the released condition.

The clamp assembly may include a clamp bolt which passes through a hole in the plough to secure the plough to the clamp bolt.

The clamp assembly may comprise a clamp bracket having two spaced arms, the clamp bolt passing through openings in each arm and the plough may engage the bolt between the arms.

In one arrangement the inclined face of the plough is located on the side of the clamp bolt which is furthest from the steering wheel, and the portion of the end of the strap which extends away from the inner tube is also located on the side of the clamp bolt that is furthest from the steering wheel.

In an alternative the inclined face of the plough is located on the side of the clamp bolt closest to the steering wheel and the ends portion of the strap that extends away from the inner tube is also located on the side of the clamp bolt closest to the steering wheel, the strap being arranged so that engagement between the upturned portion and the clamp pin prevents complete separation of the inner tube and outer tube.

The strap may be secured to the inner tube at least at both ends and preferably along substantially the whole length of the strap, by which we mean it is secured proximal the point at which the strip is being peeled away from the remainder of the strap during the collapse process. Where two strips are peeled away either side of a central strip, the central strip only may be secured to the inner tube. The strap may, alternatively, be an integral part of the inner tube. Preferably the strap is a metal strap.

The steering column assembly may form part of an unassisted, a hydraulic, or an electro hydraulic or a fully electric power assisted steering system. It may in use be fitted to a car of other road vehicle.

Other advantages of this invention will become apparent to those skilled in the art from the following detailed description of the preferred embodiments, when read in light of the accompanying drawings.

DETAILED DESCRIPTION OF THE INVENTION

Figure 1:
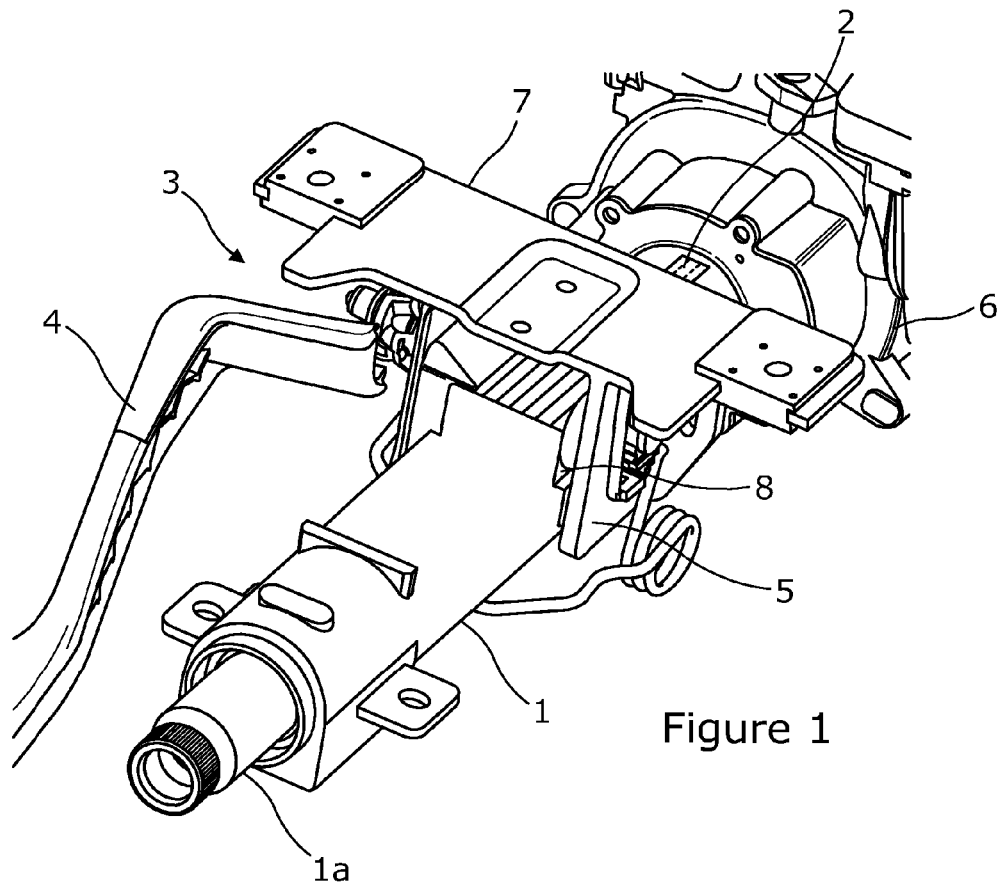
FIG. 1 is a view of a first embodiment of a steering column assembly which includes an energy absorbing strap in accordance with the present invention.

FIG. 1 shows a double-adjustment type collapsible steering column assembly, so called because it can be adjusted for rake and reach. The invention could, equally, apply to single adjust columns and non-adjust columns.

The column assembly comprises a telescopic shroud that comprises an outer tube 1 and an inner tube 2 which fits partially within the outer tube. The two tubes of the shroud can telescope relative to one another to allow for reach adjustment and which can both be moved in an arc around a pivot point axis to allow for rake adjustment. The telescoping mechanism allows the adjustment of the Reach position by the driver and also allows the first shroud portion to move forward in a controlled manner in the event of the steering wheel (not shown) being impacted by the driver in a crash.

The outer tube 1, being closest to a steering wheel (not shown), supports the steering wheel shaft 1a via a bearing. The inner tube 2, furthest from the steering wheel, is fixed securely to a part of the vehicle. There may be a special bushing (not shown) between the connecting diameters of these tubes to minimise the sliding friction.

The inner and outer tubes 2, 1 are fixed in position by a releasable clamp assembly 3 which is operated by a locking lever 4 that can be gripped by a driver. In a disengaged (unlocked, unclamped) position the outer tube 1 is free to move telescopically through the reach adjustment stroke along the inner tube 2. When in the fully engaged (locked, clamped) position, the clamp assembly secures the outer tube 1 to a so called rake bracket 5 by a positive locking of inter-engaged teeth so the inner and outer tubes 2, 1 can no longer move telescopically. It is this telescopic sliding action that enables the axial, or "Reach", position of the steering wheel to be varied.

Figure 2:
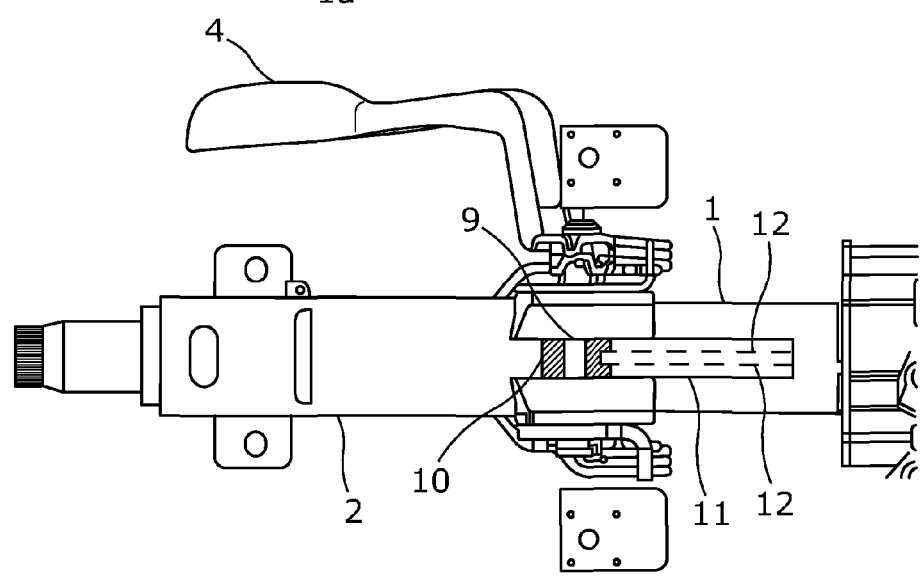
FIG. 2 is a view in plan of the assembly of FIG. 1 prior to collapse.

The lower end of the inner tube 2 is pivoted from the vehicle about a transverse axis (called the Rake Pivot axis). Rotation, in a vertical plane, of the assembly comprising both shrouds results in a variation of the steering wheel height or "Rake" setting. Alternatively, it may be fixed to an electric power steering gearbox 6 which itself is pivoted to the vehicle structure at the Rake Pivot Axis. Such a gearbox 6 is shown in FIGS. 1 and 2.

The rake bracket 5 is secured to the vehicle. The bracket comprises an inverted U-shaped bracket which has two arms which extend downwards on either side of the shroud in the region where the inner and outer tubes 2, 1 overlap. This bracket 5 helps to prevent the steering column from moving side to side under load. In the locked position, the clamp assembly locks the inner and outer tubes 2, 1 in position between the arms of this bracket to prevent rake being altered.

The rake bracket 5 is fixed to a mounting bracket 7, which in turn is secured in two places to a part of the vehicle body. In the event of a crash, additional fusible connections, acting between the mounting bracket 7 and the vehicle body, are severed by the impact force of the driver striking the steering wheel. The rake bracket 5 then slides forwards relative to the vehicle body. During this sliding process, the steering wheel is maintained in a substantially linear path by the combination of the telescoping of shrouds 1 and 2.

The clamping mechanism is designed so that the one lever 4 simultaneously releases or locks the first portion (the upper shroud) to the second and third portions (lower shroud portion and rake bracket) in respect of both the Rake and the Reach directions. The clamping system comprises a clamp bolt 9, which passes through a slot in each arm of the fixed rake bracket (which as mentioned previously is attached via the mounting bracket to the vehicle structure) and a slot in each side of a fixed rack portion, in this example a reach bracket 8, which is attached to the outer tube 1. An adjusting nut is provided at one end of the bolt and a cap at the other. Although not essential in all envisaged embodiments, it is also useful to prevent rotation of the clamp bolt 9 in order to set the adjusting nut during manufacture, without the need to temporarily clasp the clamp bolt 9.

A cam mechanism is located on the clamp bolt 9 between the nut and the outer face of one of the arms of the rake bracket. The cam mechanism comprises a pair of face-cams, one of which is prevented from rotating while the other is attached to the clamp lever 4. The length of the cam mechanism (along the axis of the bolt) can be adjusted by rotation of the lever 4. The moving cam part of the cam mechanism abuts a thrust bearing which in turn abuts the adjusting nut which is screwed onto the threaded end of the clamp bolt 9. As the cam assembly lengthens when the lever is rotated to a locked position, it applies tension to the clamp bolt, drawing the cap towards the nut and so squeezing the arms of the rake bracket onto the sides of the reach bracket.

The outer tube 1 includes an elongate slot in a position which passes between the arms of the bracket so that as the arms are squeezed together the slot tends to at least partially close. This clamps the outer tube 1 onto the inner tube 2 and helps prevent relative movement of the inner and outer tubes, fixing the length of the steering assembly. Some form of positive locking may also be provided as required, such as rows of locking teeth as is known in the art.

Figure 4:
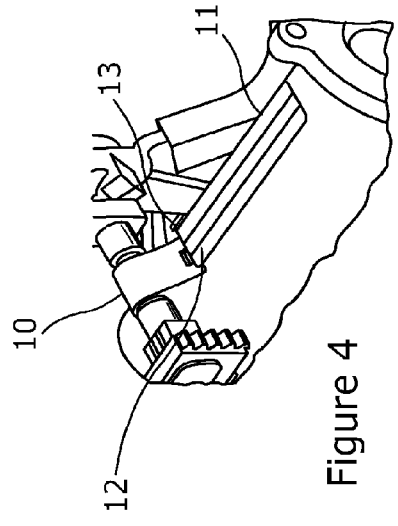
FIG. 4 is a detailed partial view of the assembly of FIG. 1 showing the connection between the plough and the energy absorbing strap prior to collapse.
Figure 5:
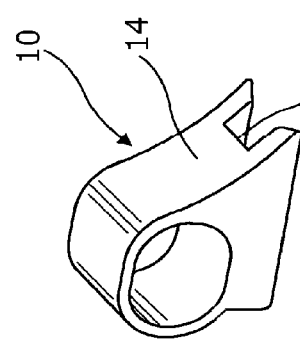
FIG. 5 shows the plough separate from the assembly with the hole through which the clamp bolt passes.
Figure 3:
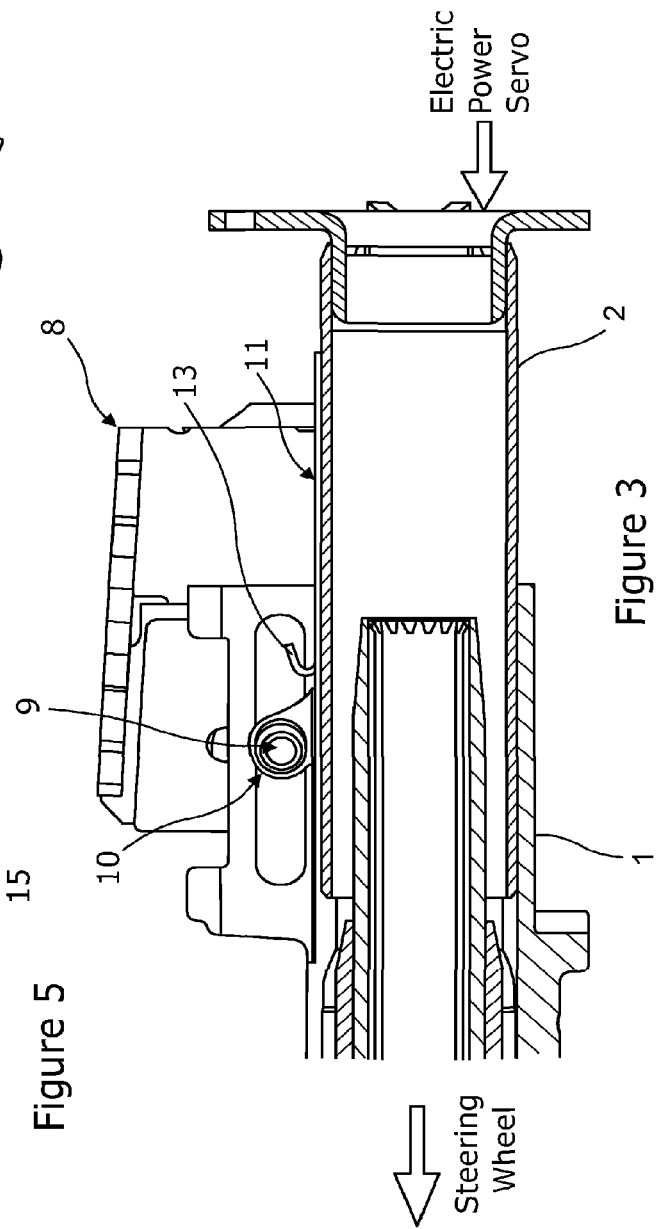
FIG. 3 is a cross sectional view in elevation of the assembly of FIG. 1 prior to collapse.
Figure 6:
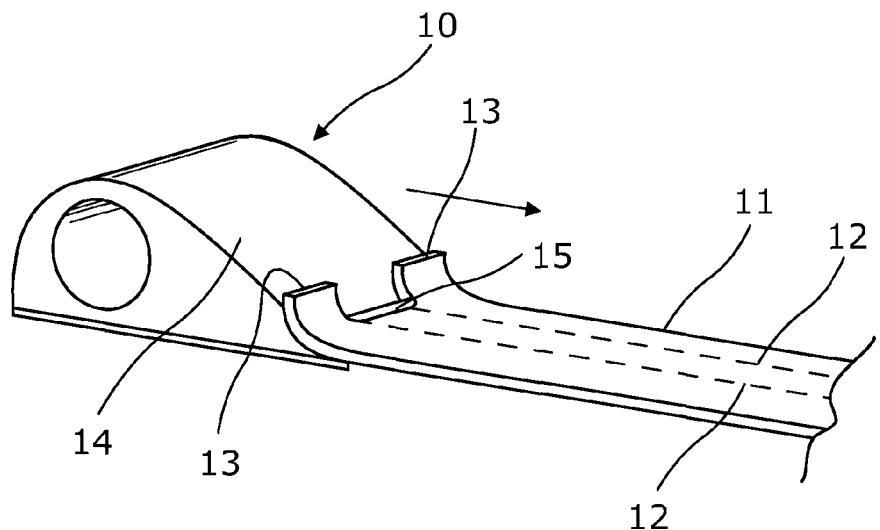
FIG. 6 is a detail view of the plough and strap only prior to collapse.

The collapse of the shroud is controlled by an energy absorbing system that comprise a plough 10 and an energy absorbing strap 11. These can best be seen in FIGS. 3, 4 and 5 of the drawings. The plough 10 is fixed to the clamp bolt 9 of the clamp mechanism, which passes through an opening 11 in the plough 10. The strap 11 is fixed to the inner tube 2 and contacts the plough 10 at its ends portions closest to the steering wheel prior to a collapse. During a collapse the plough is driven through the strap by the clamp bolt, progressively tearing part of the strap 11 away from the inner tube 2. This tearing action absorbs the energy in the collapse.

In the first embodiment of FIGS. 1 to 5, the plough 10 comprises a wedge shaped member with the inclined front face 14 of the wedge facing away from the steering wheel and the leading edge of the wedge being located at the end of the energy absorbing strap. A middle part of the leading edge is cut away to form a pressing portion 15.

The energy absorption strap 11 is attached along its centreline to the Inner Tube of the telescopic steering column, preferably by welding. The strap 11 features two parallel lengthwise V-grooves 12 with sharp roots which divide it into three elongate portions of approximately equal width and which act as tear-lines. The ends 13 of the outer portions of the strap which are nearest to the Steering Wheel are turned upwards to allow the sharp leading edge of the metal Plough part 10 to access their underside.

Figure 7:
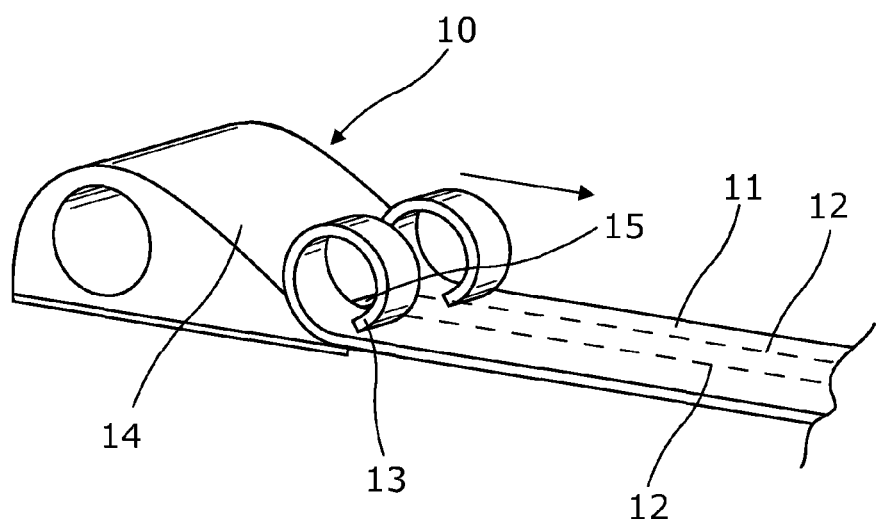
FIG. 7 is a detail view corresponding to FIG. 6 after a collapse.

The leading edge of the plough is located on the side of the clamp bolt which is furthest from the steering wheel and tucked underneath the upturned ends 13 of the strap. The pressing portion 15 is located above the end of the central part of the strap 11. In a crash, the outer tube 1 and steering wheel travels forwards in the vehicle. Because the clamp bolt 9 is secured to the outer tube 2 via the adjustment locking mechanism, both it and the plough 10 also move forward. In a crash, the inner tube 1 remains stationary relative to the vehicle structure and hence so does the energy absorbing strap 11. The leading edge of the plough is therefore forced to slide under the outer portions of the strap 11, progressively peeling them away from the inner tube while also tearing them away from the central portion along the said grooves. This is shown in FIG. 7 of the drawings. The effect is to absorb the kinetic energy of the driver's upper torso in a progressive manner and to thereby avoid excessive peak forces. During this process, the said outer portions form compact coils (in the manner of machine tool swarf) which ensures that they do not entangle with other parts of the column.

Figure 9:
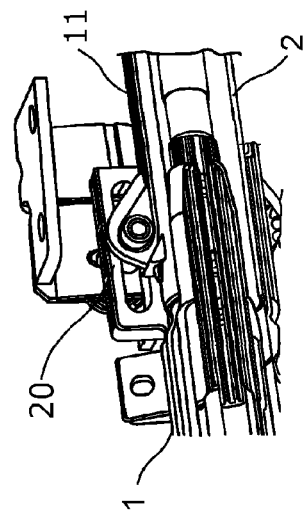
FIG. 9 is a detailed partial view of the assembly of FIG. 8 showing the connection between the plough and the energy absorbing strap prior to collapse.
Figure 10:
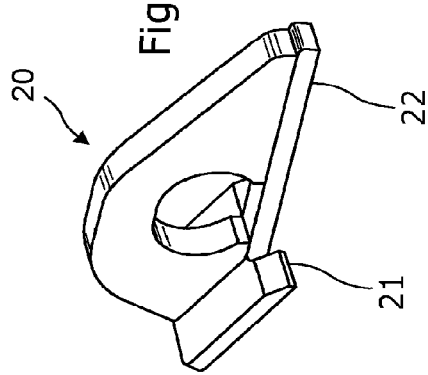
FIG. 10 shows the plough separate from the assembly with the hole through which the clamp bolt passes.
Figure 8:
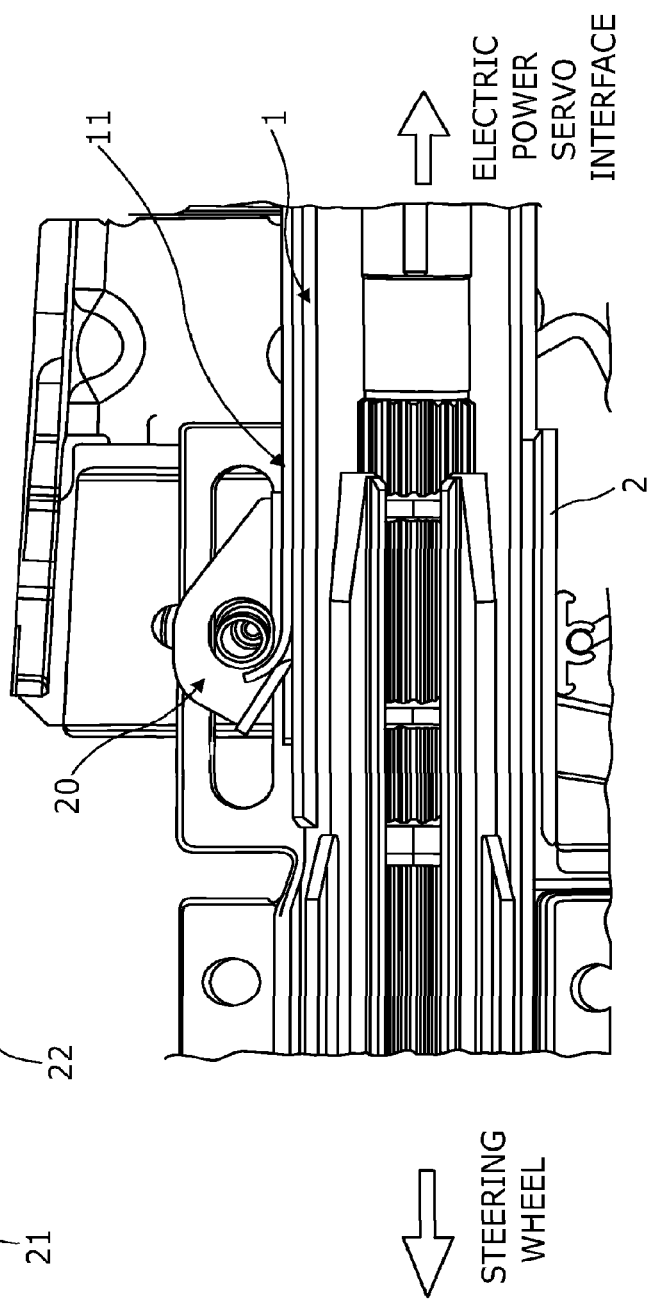
FIG. 8 is a cross sectional view in elevation of a second embodiment of a collapsible steering column assembly which is similar to that shown in FIG. 1 apart from the arrangement of plough and energy absorbing strap.

In a second embodiment of the Invention, shown in FIGS. 8 to 10 a plough 20 is provided which has a different form. The sharp leading edges 21 of the plough 20 are situation on the side of the clamp bolt 9 which is nearest to the steering wheel. As with the first embodiment the edge 21 and the inclined front face of the wedge passes under the outer portion of the strap which is upturned at its ends, whilst a pressing part 22 is located above the central end of the strap to hold the strap down.

Providing the upturned ends of the strap 11 on the steering wheel side of the clamp bolt provides an anti-separation feature. The Anti-Separation Function is pertinent to EPAS columns in which the upper mounting means is separate from the lower mounting means, rather than being realized via a single rigid integrated bracket which incorporates both the upper and lower fixings. In the case of such EPAS columns, the rake bracket may be fixed (as already described) via capsules to the vehicle structure by two studs at the so-called upper mountings while the EPAS servo housing is pivotally mounted to the vehicle structure at its lower end to allow vertical rotation of the whole assembly for height adjustment of the steering wheel. There is no mechanical connection between the said upper and lower mountings other than the telescopically sliding column tubes and shafts. Although the absence of the said integrated bracket minimises cost, there is a danger with such columns that the upper and lower sub-assemblies will separate and fall apart if the column's adjustment clamp is inadvertently released prior to the system being mounted in the vehicle. This is inconvenient and potentially injurious to factory operatives.

A strap 11 realised in the form of the second embodiment of the invention will prevent this unintentional separation because the clamp bolt is trapped by the upturned ends 13 of the strap 11, preventing it being withdrawn past the upturned ends and thus preventing the outer tube being pulled completely off the inner tube.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A collapsible steering column assembly which includes a shroud comprising an outer tube that supports a steering wheel through a bearing and an inner tube that is fixed to a part of a vehicle, the column assembly being able to collapse telescopically by the outer tube moving over the inner tube, the column assembly further including an energy absorbing strap that is fixed to the inner tube and a plough which is fixed to the outer tube, whereby in use the column assembly is so arranged that upon a telescopic collapse the relative movement between the inner tube and the outer tube forces a part of the plough through the strap to progressively peel away a part of the strap from a remainder of the strap, in which the plough comprises a wedge member that has an inclined front face terminating in a leading edge that is located below an upturned end part of the strap which projects out away from the inner tube and during collapse the inclined front face is driven between the inner tube and upturned end part of the strap to progressively tear the upturned end part away from the remainder of the strap, and in which the plough includes a pressing part which is located above a portion of the strap adjacent the part that is torn away by the inclined front face.

2. The collapsible steering column according to claim 1 the pressing part pressing down on the portion of the strap when in use to hold the portion of the strap down whilst the inclined front face of the wedge member progressively peels away the upturned end part of the strap.

3. The collapsible steering column assembly according to claim 2 in which the plough comprises two spaced apart inclined front faces, each having a first leading edge that is located below a respective upturned end part of the strap that extends away from the inner tube on either side of the pressing part, the two spaced apart inclined front faces of the plough peeling away two parallel strips of the strap leaving a central strip in place.

4. The collapsible steering column assembly according to claim 3 in which the strap includes two grooves along a length thereof to define a central portion and two outer portions, the outer portions being located above the first leading edges.

5. The collapsible steering column assembly according to claim 1 in which the plough is so shaped that the part of the strap that is peeled away during the collapse forms a curl.

6. The collapsible steering column assembly according to claim 5 in which the inclined front face of the wedge member of the plough is concave, at least a portion of which increases in gradient the further from the leading edge so as, in use, to cause the part of the strap that is peeled away to, during the collapse, form the curl.

7. The collapsible steering column assembly according to claim 1 which comprises a single or double adjust steering column assembly and includes a clamp mechanism that includes a part that is fixed relative to the outer tube, the tubes being releasably engaged by the clamp mechanism to selectively permit an amount of relative movement between the tubes that is required during adjustment of the steering column assembly.

8. The collapsible steering column assembly according to claim 7 in which the part of the clamp mechanism that is fixed to the outer tube is fixed to the plough so that the plough is fixed relative to the outer tube when the clamp assembly is both in a clamped and a released condition.

9. The collapsible steering column assembly according to claim 7 in which the clamp mechanism includes a clamp bolt which passes through a hole in the plough.

10. The collapsible steering column assembly according to claim 9 in which the part of the plough that engages the strap is located on a side of the clamp bolt which is furthest from the steering wheel, and in which an upturned end portion of the strap which the plough engages is also located on the side of the clamp bolt that is furthest from the steering wheel.

11. The collapsible steering column assembly according to claim 9 in which the part of the plough that engages the strap is located on a side of the clamp bolt which is nearest to the steering wheel, and in which an upturned end portion of the strap which the plough engages is also located on the side of the clamp bolt that is nearest to the steering wheel, the strap being arranged so that engagement between the upturned portion and the clamp bolt prevents complete separation of the inner tube and outer tube.

12. The collapsible steering column assembly according to claim 1 in which the strap is secured to the inner tube only along a central strip of the strap.

* * * * *